(12) United States Patent
Blythe

(10) Patent No.: US 10,721,609 B1
(45) Date of Patent: Jul. 21, 2020

(54) LOCATION TRACKING AND CRISIS SUPPORT ALLOCATION

(71) Applicant: Jemall Blythe, Virginia Beach, VA (US)

(72) Inventor: Jemall Blythe, Virginia Beach, VA (US)

( * ) Notice: Subject to any disclaimer, the term of this patent is extended or adjusted under 35 U.S.C. 154(b) by 0 days.

(21) Appl. No.: 16/819,043

(22) Filed: Mar. 14, 2020

(51) Int. Cl.
| | |
|---|---|
| *H04M 11/04* | (2006.01) |
| *H04W 4/90* | (2018.01) |
| *H04W 4/029* | (2018.01) |
| *G06F 16/9535* | (2019.01) |
| *H04L 29/08* | (2006.01) |
| *G06F 16/903* | (2019.01) |
| *H04W 4/12* | (2009.01) |

(52) U.S. Cl.
CPC ........ *H04W 4/90* (2018.02); *G06F 16/90335* (2019.01); *G06F 16/9535* (2019.01); *H04L 67/306* (2013.01); *H04W 4/029* (2018.02); *H04W 4/12* (2013.01)

(58) Field of Classification Search
CPC ...... G08B 25/016; H04W 4/02; H04W 4/029; H04W 4/90; H04W 76/50; H04W 64/00
See application file for complete search history.

(56) References Cited

U.S. PATENT DOCUMENTS

| | | | | |
|---|---|---|---|---|
| 2010/0069058 A1* | 3/2010 | Rothschild | ............ | H04W 4/029 455/422.1 |
| 2015/0245168 A1* | 8/2015 | Martin | ..................... | H04L 67/18 715/751 |
| 2016/0246790 A1* | 8/2016 | Cowdrey | ................ | G06Q 50/01 |
| 2016/0306949 A1* | 10/2016 | Tallapaneni | ............. | G06F 21/10 |
| 2017/0188395 A1* | 6/2017 | Kim | ......................... | H04W 4/80 |

* cited by examiner

*Primary Examiner* — Shantell L Heiber
(74) *Attorney, Agent, or Firm* — P. Jeff Martin; The Law Firm of P. Jeffrey Martin, LLC

(57) ABSTRACT

One example method of operation may include receiving an indication from a user device, retrieving a user profile associated with the user device, comparing the user profile to one or more other user profiles associated with other user devices within a predefined distance of the user device, selecting a first of the other user profiles to pair with the user profile based on the comparing, transmitting an alert notification to a first of the other user devices associated with the first of the other user profiles, and receiving a response indicating whether the user profile and one or more other user profiles have paired.

14 Claims, 9 Drawing Sheets

300

| | |
|---|---|
| USER DEVICE 120 — USER (POTENTIAL SPONSOR) 122 | USER 122 SUMMARY (302):<br>• 20 YEAR VETERAN<br>• 6 YEAR SPONSORSHIP<br>• CATEGORIES: SUBSTANCE ABUSE, INSOMNIA, PTSD, HEAD INJURY, LIMB INJURY, WAR VETERAN, MARRIED WITH CHILDREN<br>• CURRENT LOCATION FROM VETERAN IN-NEED (21 MILES) |
| USER DEVICE 130 — USER (POTENTIAL SPONSOR) 132 | USER 132 SUMMARY (304):<br>• 5 YEAR VETERAN<br>• 3 YEAR SPONSORSHIP<br>• CATEGORIES: PTSD, HEAD INJURY, WAR VETERAN, SINGLE<br>• CURRENT LOCATION FROM VETERAN IN-NEED (8 MILES) |
| USER DEVICE 140 — USER (POTENTIAL SPONSOR) 142 | USER 142 SUMMARY (306):<br>• 10 YEAR VETERAN<br>• 6 YEAR SPONSORSHIP<br>• CATEGORIES: SUBSTANCE ABUSE, MARRIED WITH CHILDREN<br>• CURRENT LOCATION FROM VETERAN IN-NEED (6 MILES) |
| USER DEVICE 150 — USER (POTENTIAL SPONSOR) 152 | USER 152 SUMMARY (308):<br>• 20 YEAR VETERAN<br>• 4 YEAR SPONSORSHIP<br>• CATEGORIES: INSOMNIA, PTSD, HEAD INJURY, LIMB INJURY, WAR VETERAN, MARRIED WITH CHILDREN<br>• CURRENT LOCATION FROM VETERAN IN-NEED (4 MILES) |
| USER DEVICE 110 — USER (IN NEED) 112 | USER 112 SUMMARY (310):<br>• 20 YEAR VETERAN<br>• 6 YEAR SPONSORSHIP<br>• CATEGORIES: SUBSTANCE ABUSE, INSOMNIA, PTSD, HEAD INJURY, LIMB INJURY, WAR VETERAN, MARRIED WITH CHILDREN<br>• CURRENT STATUS (NEEDS IMMEDIATE ASSISTANCE) |

LOCATION TRACKING AND CRISIS SUPPORT ALLOCATION

TECHNICAL FIELD OF THE APPLICATION

This application relates to identifying application users, such as those associated with a social networking application, and more particularly, to identifying and tracking credentials and locations of users to support other users in times of crisis.

BACKGROUND OF THE APPLICATION

Conventional medicinal care for veterans of the armed services includes a bureaucratic government sponsored care system that limits the amount of care to those that need it the most. Veterans of war, for example, may have complex mental health issues that require spontaneous help and assistance to those willing to provide such care. The wait time for psychiatric care and related health care services varies from VA hospital to hospital throughout the United States. Ideally, the individuals could receive care through alternative services managed by a real-time service application and supported by the members of a social network.

SUMMARY OF THE APPLICATION

One example embodiment may provide a method that includes identifying a member device in need of assistance, locating potential sponsor profiles qualified to provide the assistance, identifying scores for each of the potential sponsor profiles, and selecting an optimal sponsor profile based on its score being greater than other scores assigned to other potential sponsor profiles.

Another example embodiment may include receiving an indication from a user device, retrieving a user profile associated with the user device, comparing the user profile to one or more other user profiles associated with other user devices within a predefined distance of the user device, selecting a first of the other user profiles to pair with the user profile based on the comparing, transmitting an alert notification to a first of the other user devices associated with the first of the other user profiles, and receiving a response indicating whether the user profile and one or more other user profiles have paired.

Another example embodiment may include an apparatus that includes a receiver configured to receive an indication from a user device, a processor configured to retrieve a user profile associated with the user device, compare the user profile to one or more other user profiles associated with other user devices within a predefined distance of the user device, and select a first of the other user profiles to pair with the user profile based on the comparing, a transmitter configured to transmit an alert notification to a first of the other user devices associated with the first of the other user profiles, and a receiver configured to receive a response indicating whether the user profile and one or more other user profiles have paired.

Still yet another example embodiment may include a non-transitory computer readable storage medium configured to store instructions that when executed cause a processor to perform receiving an indication from a user device, retrieving a user profile associated with the user device, comparing the user profile to one or more other user profiles associated with other user devices within a predefined distance of the user device, selecting a first of the other user profiles to pair with the user profile based on the comparing, transmitting an alert notification to a first of the other user devices associated with the first of the other user profiles, and receiving a response indicating whether the user profile and one or more other user profiles have paired.

BRIEF DESCRIPTION OF THE DRAWINGS

FIG. 3 illustrates profile data matching and scoring for profile data of the application members.

FIG. 8 illustrates a graphical user interface for registering a user profile with the social networking application according to example embodiments.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, users may have user profiles setup and registered with a social network application to maintains profile information about the users so a user in need of immediate assistance can be easily identified and paired with one or more other potential user profiles (sponsors) registered to provide assistance to that user who may be experiencing short term depression or experiencing an acute mental health crisis. Also, the user profiles may assist with identifying qualified sponsors who may receive a credit or value for their assistance with the user members in need.

Figure 1:
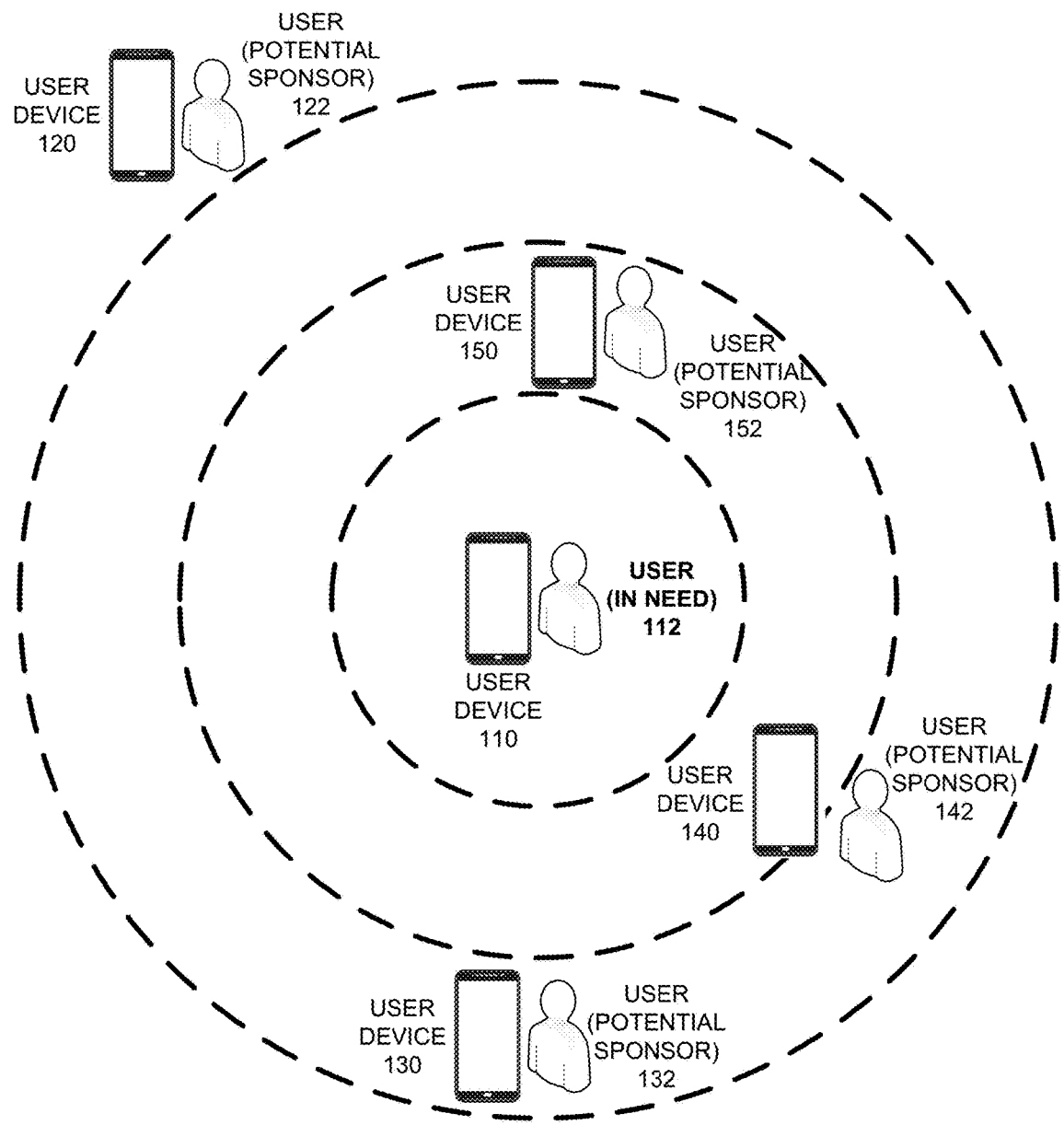
FIG. 1 illustrates a network configuration diagram according to an example embodiment of the present application.

FIG. 1 illustrates a network configuration diagram according to an example embodiment of the present application. Referring to FIG. 1, the configuration 100 includes a distance map of registered users and their locations respective to the user 112 experiencing an emergency or requiring immediate assistance. In operation, a user in need of assistance 112 may be part of a social network application registered via a user profile which is accessible via the application on the user's user device 110. In one example, the user may be a war veteran with post traumatic stress disorder (PTSD) that is having an acute mental health crisis and needs to speak with someone or meet with someone that is qualified to assist the person, such as a fellow war veteran or related person identified through their application profile. In this example, the user device 110 is closest in distance to a user device 150 operated by a potential sponsor 152, and is next closest to a user device 140 operated by a potential sponsor 142, and next closest to a user device 130 operated by a potential sponsor 132, and further from a user device 120 operated by a potential sponsor 122.

Figure 2:
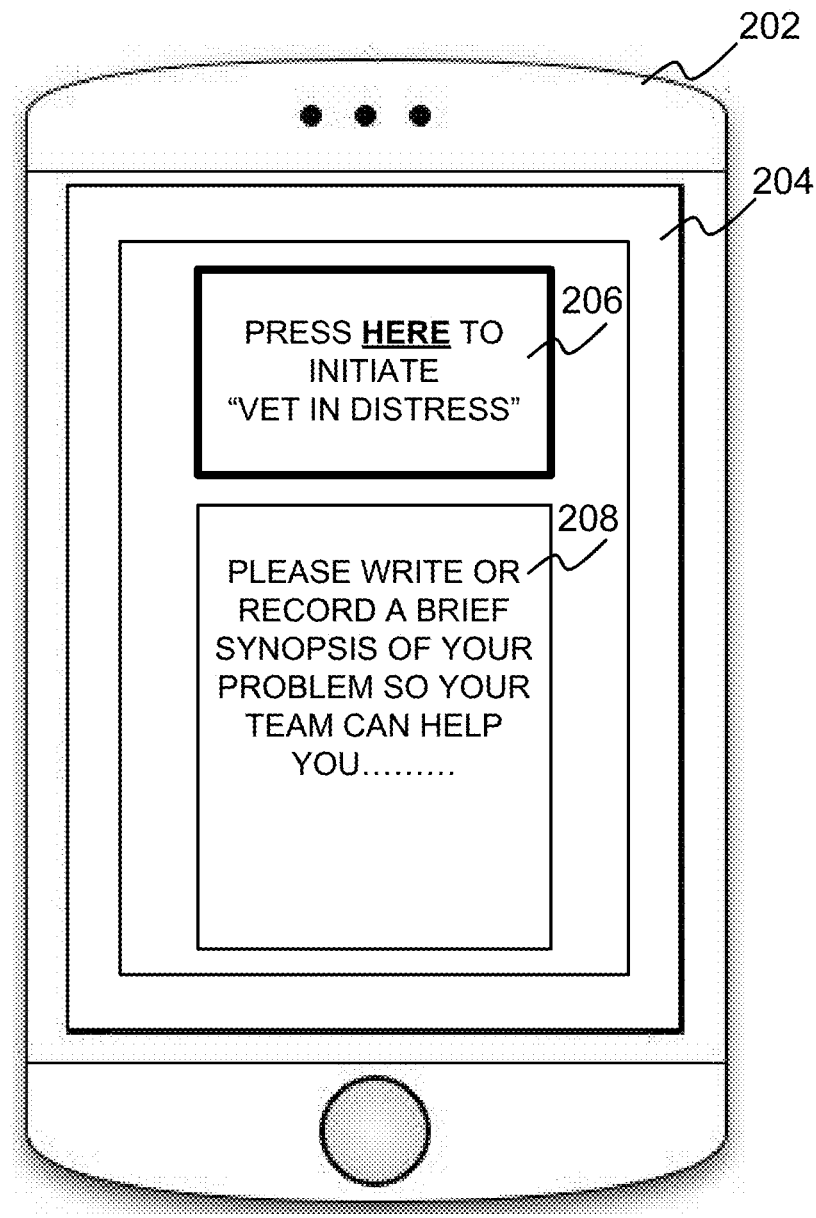
FIG. 2 illustrates a user interface of an assistance application according to an example embodiment of the present application.

FIG. 2 illustrates a user interface 200 of an assistance application according to an example embodiment of the present application. The example interface demonstrates one feature of the application operating on the user device 202. For example, a display screen 204 is providing an option 206 to have a distress signal sent to the network of nearby sponsors or registered members that could help via a live conference or can come to the location and help the person in need. Additional options 208 may include a memorandum option to input the information specific to the problem the user is experiencing, this may enable more accurate scoring procedures to be used to pair the user with the appropriate assistance.

FIG. 3 illustrates profile data matching and scoring for profile data of the application members. Referring to FIG. 3, the profile information 300 of the members is illustrated (302-310) as a set of words and categories which includes certain words or status measures (e.g., time, categories) that may match the profile 310 of the person in need of assistance. As may be observed, the user in need 112 is a 20 year veteran, with 6 years of sponsorship experience in the social network group, and has experience in substance abuse, insomnia, PTSD, head injury, limb injury, is a war veteran, is married with children and needs immediate assistance. The fact that the user needs immediate assistance may make the location distance of the user 112, identified from their user device 110 location, a highly weighted variable for those within 'X' (10) miles of the user, which may be a defined distance believed to be sufficient to travel to the user's location quickly to prevent a tragedy, such as suicide, drug use or damage to property or other persons. Also, the nearest user device to the user device of the person in need may also be highly weighted as the likely candidate to assist the user. The distance in an immediate need scenario, may be weighted multiple times more than other factors. For example, if the other parameters/attributes are all weighted with a single weight W1, then those distance parameters may be weighted three (W3) or even five (W5) times when scoring the best candidate to offer to the user in need. In this case, since the user device 150 is only 4 miles away and the number of other attributes are significantly matching, more so then the attributes for user 142 or 132, then the user 152 will likely be paired with the user in need 112. The user 122 may have more matches, however, because the user in need requires immediate assistance, the distance of 21 miles will significantly weight the user profile for user 122 lower so that user is no longer a candidate for immediate assistance. If however, the user did not need immediate assistance or location specific assistance, then the user profile for user 122 may be acceptable, given the amount of attributes matching the two users, for a live conference or other function other than traveling to the user 112's location in an immediate meetup event.

Figure 4:
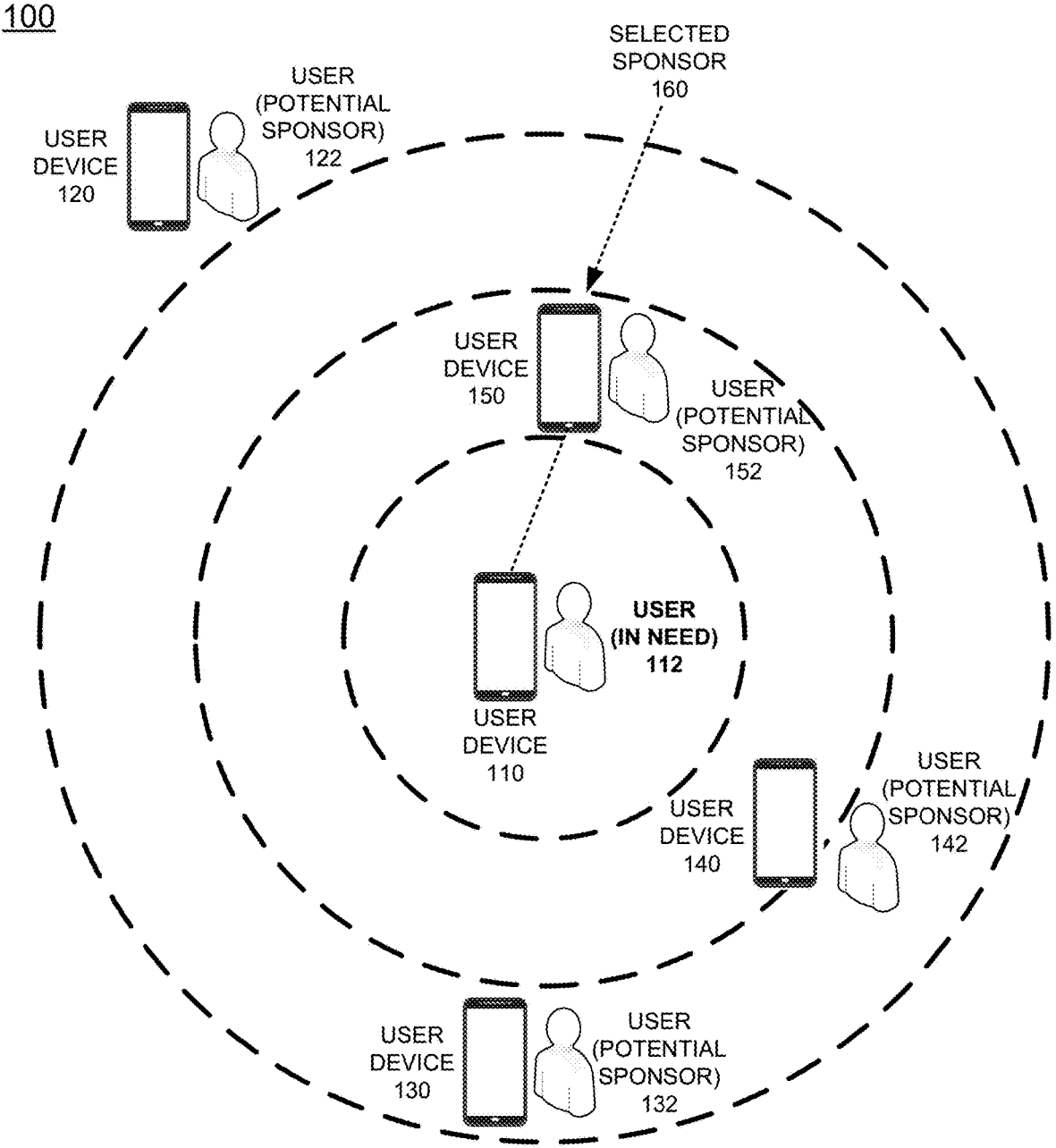
FIG. 4 illustrates a network configuration diagram used to select a potential sponsor according to an example embodiment of the present application.

FIG. 4 illustrates a network configuration diagram used to select a potential sponsor according to an example embodiment of the present application. Referring to FIG. 4, the example configuration 100 of FIG. 1 is illustrated along with a selected 160 'sponsor' user 152 being assigned to the user 112 since the attribute matching is significantly overlapping for both candidates and the users are close from a distance perspective. The score for the user profile of user 152 is higher/greater than the other users based on the weights applied to the attributes of the profiles which matched the between the users. Higher/greater indicates that the magnitude is larger than the other results, so a score with a larger magnitude may be deemed higher or greater or larger than another score.

Figure 5:
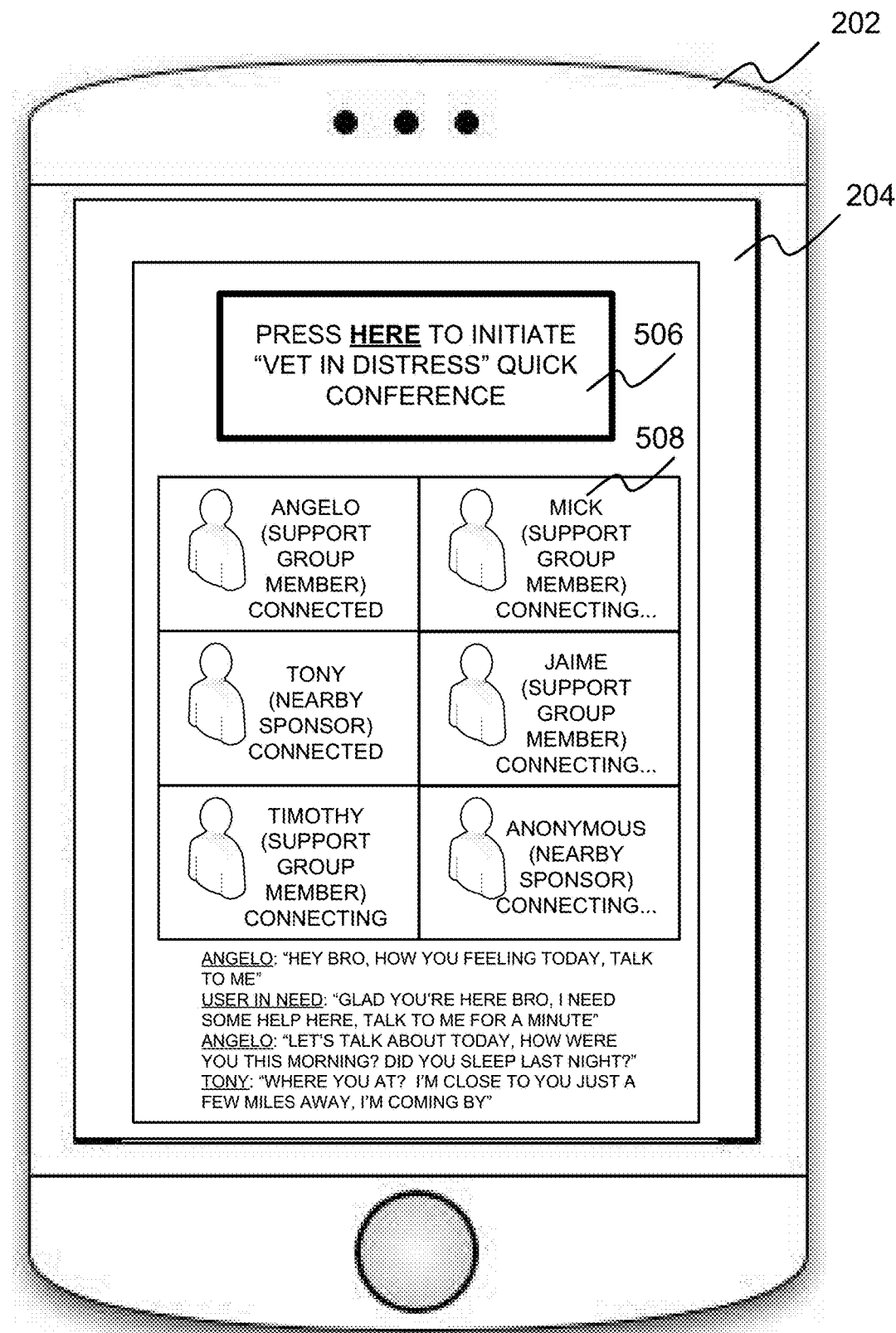
FIG. 5 illustrates a user interface for initiating a real-time group meeting according to an example embodiment of the present application.

FIG. 5 illustrates a user interface for initiating a real-time group meeting according to an example embodiment of the present application. Referring to FIG. 5, the configuration 500 illustrates another alternative service offered by the application. In this example, the user may initiate an emergency meeting/conference 506 with other members 508 of a support group or those who are qualified to be invited to the user's emergency meeting which was initiated due to an unsure or insecure feeling the user may have experienced from a chemical imbalance or other event, such as a bad day or incident that caused the stress to occur. The meeting demonstrates multiple user interface sections for users to join in a multi-conference video/audio chat session and begin sharing video, text and/or audio with the user in need of immediate assistance.

In another example, a group meeting may be assembled on-the-fly, such as in the case of a group therapy session over a video chat interface where all or some of the participants in the group are live in-person and others are live but are only connected via their user device interface. When a veteran cannot make it to the hospital and/or community center where the group chats are being conducted, the remote access interface provides a way to be present without requiring a live in-person presence.

When grouping users together in chat sessions or in pairing operations conducted to help a veteran "in need", the similarities among the users may be factors which are weighted to mathematically determine which users should be paired together. The specific criteria may include someone with 20 years of service which can be a user's greatest weight if specific, or other factors, such as combat veterans only, closest person (i.e. proximity) when a suicidal parameter is identified. In the suicidal example, the application may heavily weight a factor, such as distance/proximity when seeking to pair veterans with other veterans in need of assistance.

When a veteran is in distress, a user may set a radius for potential assistance and change the radius depending on the needs and desires of the service, the information in the user profiles may be updated regularly based on location, lists of registered users, etc., When the users that are active are identified, the veterans may be listed in a temporary file by name with comma separated values (csv), then as a distress button is selected by one of the veterans, the temporary file of user names may be reordered into a preferred format based on the veteran profile and the applied weights, preferences and needs, then the information pairing may be calculated with scores, and the results may be provided to the application which selects a first person which is most highly weighted. The application may operate by making the top-tier highest weighted selection and then connecting the parties together with a notification, waiting a predetermined amount of time (e.g., 60 seconds) for confirmation by the parties and then selecting a second most qualified candidate and repeating the process to determine whether a confirmation is received.

Figure 6:
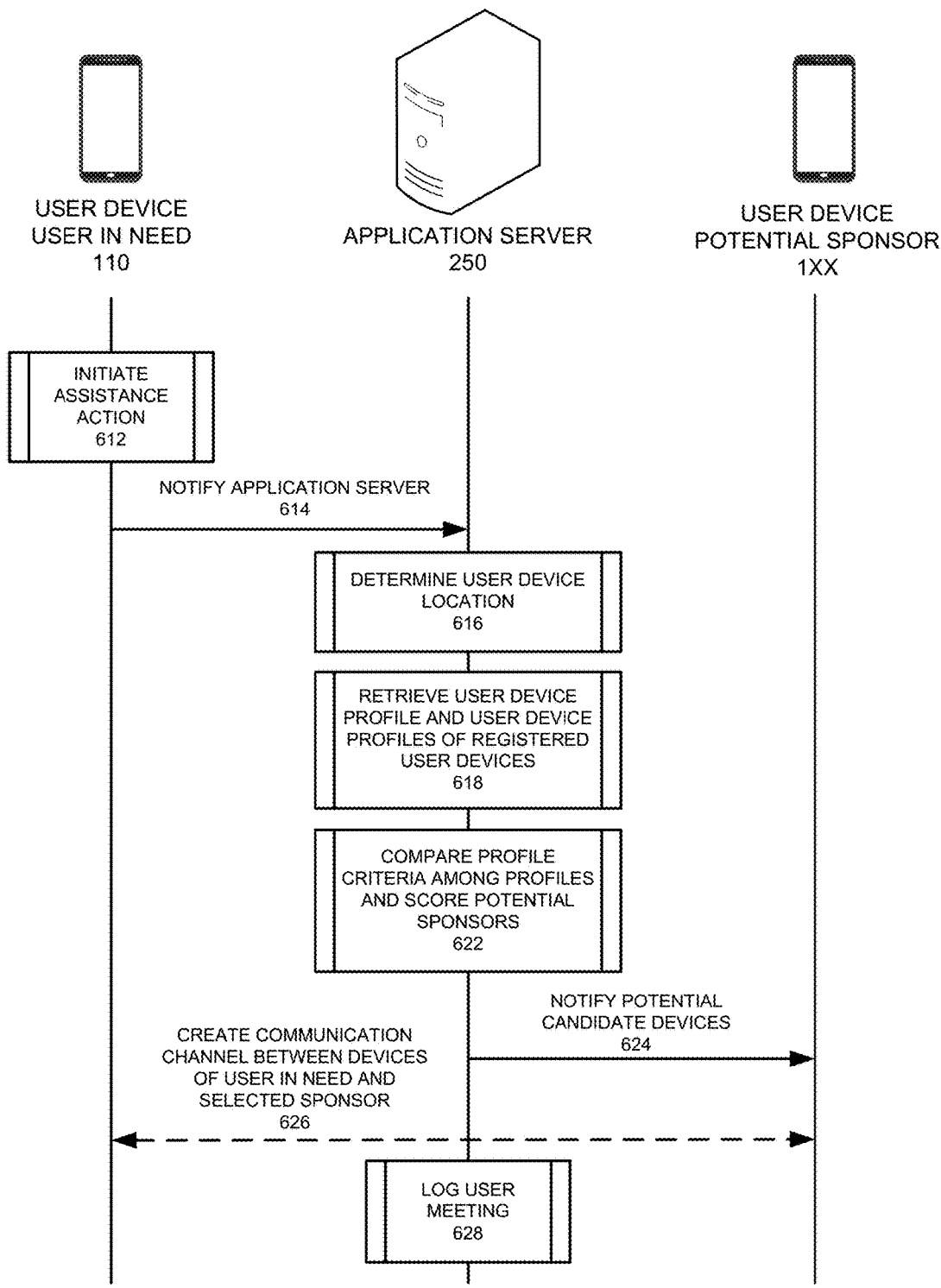
FIG. 6 illustrates a system configuration for initiating the assistance application according to example embodiments.

FIG. 6 illustrates a system configuration for initiating the assistance application according to example embodiments. Referring to FIG. 6, network system 600 demonstrates the messaging between the user device 110 of the user in need and an application server 250 managing the services of the application and a potential other user device 1XX, which could be any of the devices available in the user's area of assistance. The user may initiate the need for assistance with an action 612, such as a button selection. The application server 250 may receive a message 614 and determine the user device location 616, retrieve the user device profile 618 and compare the profile criteria among the profiles and score the potential sponsors 622 by applying weights and summing the weights for each attribute match and applying larger weights to more important categories and attributes. Examples of more relevant categories are distance, PTSD, war veteran, age, etc., so the user in need can relate to the potential sponsors better. Once the scores are tallied, the potential candidate devices 624 can be notified and any of those available may accept the invitation to be the sponsor, then a channel may be created, such as a data session or call 626 between the two devices. The result of the meeting may be logged 628 in memory for future reference purposes.

Figure 7:
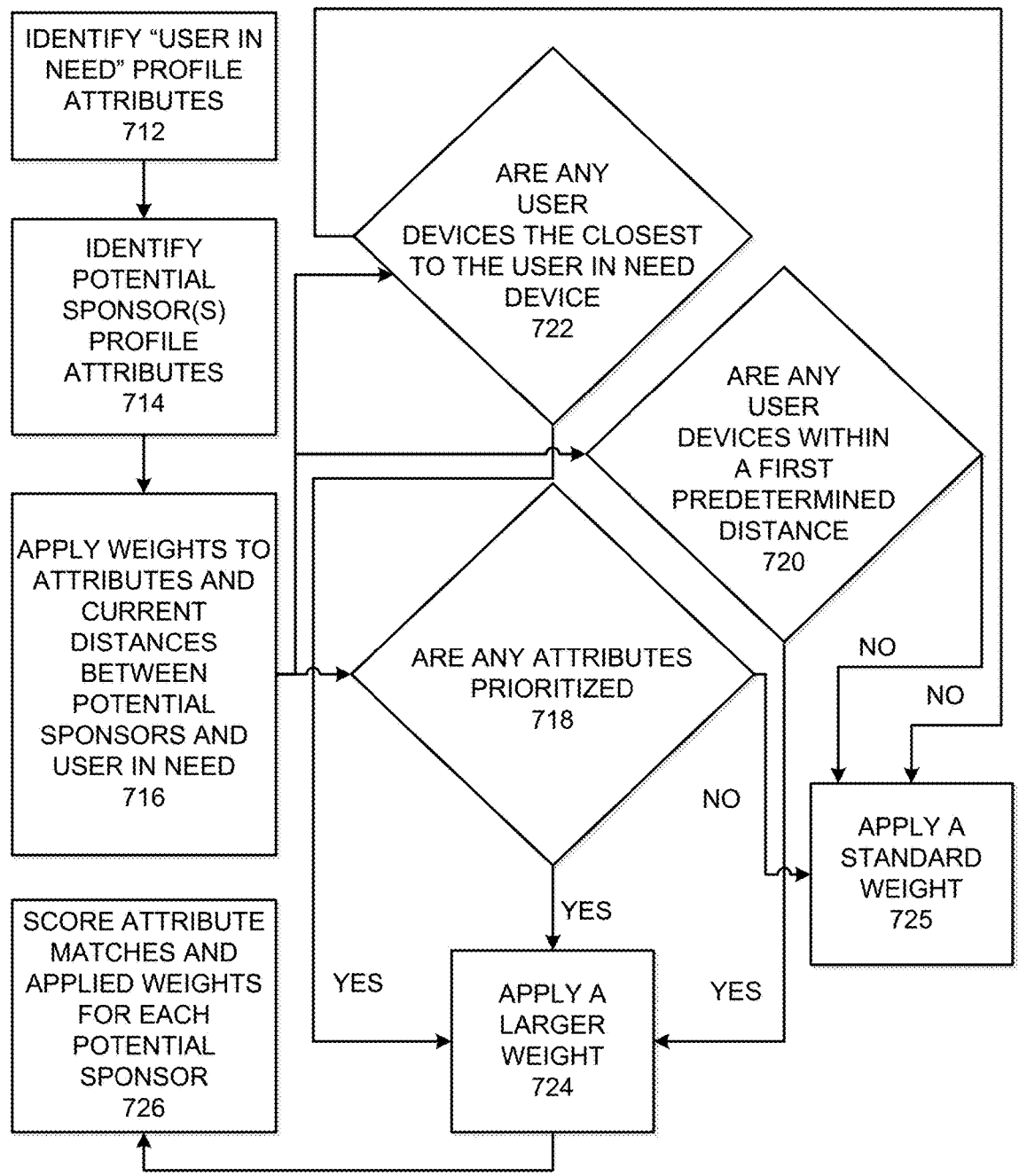
FIG. 7 illustrates a flow diagram for identifying a user profile in need of assistance and pairing the user profile with potential sponsor profiles according to example embodiments.

FIG. 7 illustrates a flow diagram for identifying a user profile in need of assistance and pairing the user profile with potential sponsor profiles according to example embodiments. Referring to FIG. 7, the example process 700 includes the operations of identifying a user profile and attributes of the profile for the user in need of service 712, identifying available sponsor profiles and the attributes of those profiles 714, applying weights to the attributes and distances 716 between a location of the user in need and the locations of potential sponsor users. Next, several decisions may be made to apply larger weights 724, such as are any user devices the closest to the user in need 722, are any user devices within a set distance 720 and are any attributes of the user profiles considered prioritized 718. If not, then a standard weight may be applied 725, such as a value of 1 or 2, but if so, the weights may be increased by several weight sizes to 3, 4, or more to increase an overall score assigned to each user profile. Then the scores are identified based on matches and total weights applied and a potential sponsor is identified 726.

According to one example embodiment, a process may include receiving an indication from a user device, such as a user in need of assistance, retrieving a user profile associated with the user device so the user's parameters, needs and other information can be identified. The process continues by comparing the user profile to one or more other user profiles associated with other user devices within a predefined distance of the user device to determine differences and similarities. The process further provides selecting a first of the other user profiles to pair with the user profile based on the comparing, transmitting an alert notification to a first of the other user devices associated with the first of the other user profiles, and receiving a response indicating whether the user profile and one or more other user profiles have paired.

The indication from the user device is a distress notification indicating a user is in need of assistance. The process may also include receiving a failed pairing attempt notification after a predetermined amount of time after transmitting the alert notification to the first of the other user devices, selecting a second of the other user profiles to pair with the user profile, initiating a timer to expire when the predetermined amount of time has lapsed, transmitting another alert message to a second user device associated with the second of the other user profiles, and receiving a confirmation that the second user device has confirmed the alert message and the second of the other user profiles have paired with the user profile prior to the timer expiring. The process may also include determining a score for each of the other user profiles based on a number of parameters of each profile which match between the user profile and the other user profiles, applying a plurality of different weight sizes to each of the parameters of each of the other user profiles prior to determining the score and applying a largest weight to a distance parameter of the one or more user profiles that is associated with a corresponding user device having a closest proximity to the user device. If a user is suicidal or violent and identified as such by the profile, the distance of one member to another may become critical and may be weighted higher than any other weight. The sum of weights is the score for any user profile when comparing those potential members that could be assigned or invited to help a member in need.

Figure 8:
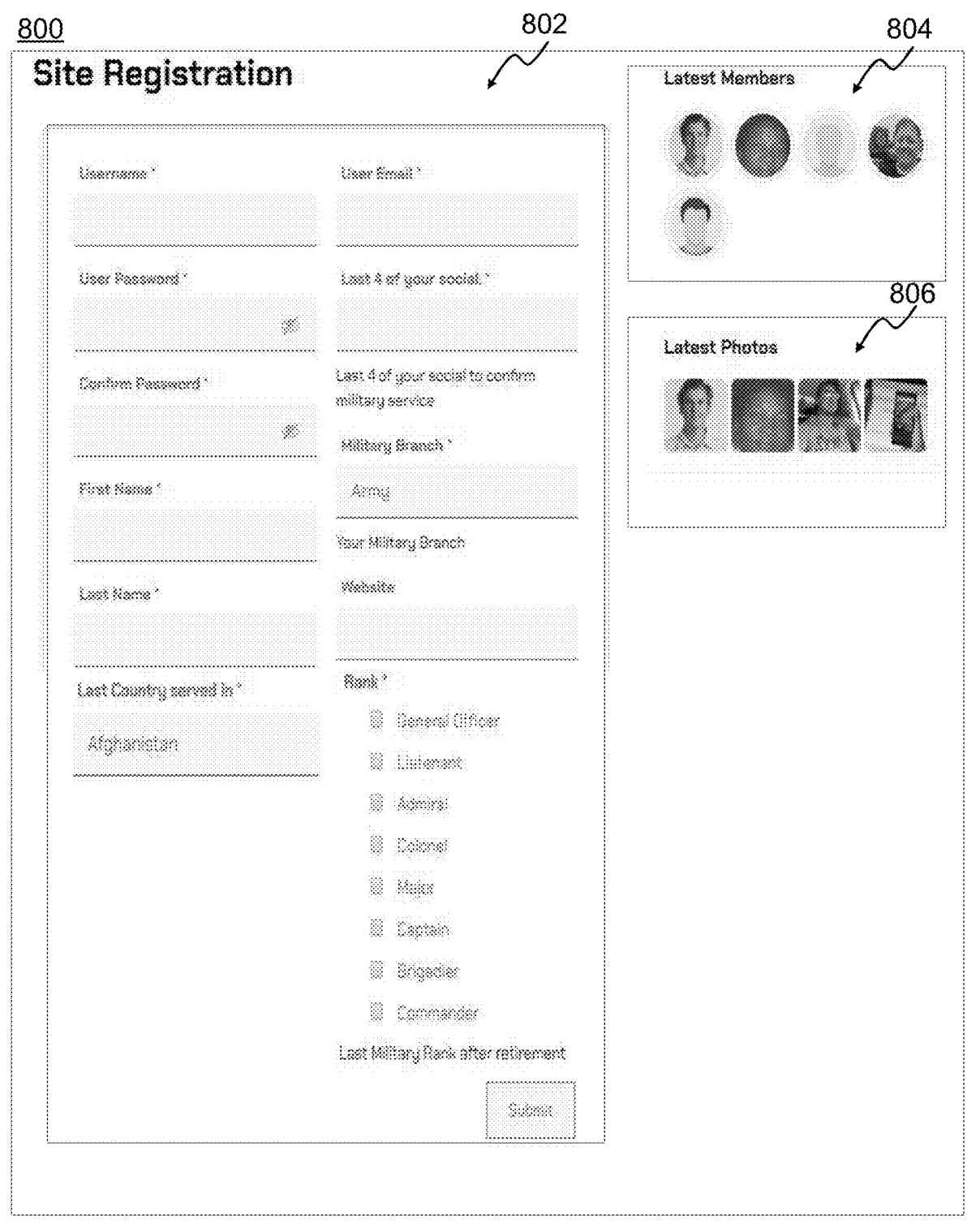

FIG. 8 illustrates a registration user interface for the application according to example embodiments. Referring to FIG. 8, the user interface 800 includes a sign-up list of parameters 802 to help secure and store parameters which define a member and other members. The members may be listed in a group of members window 804 along with photos and other information 806. The profiles are stored in a database where they can be retrieved, compared and scored for relevance and pairing purposes.

Figure 9:
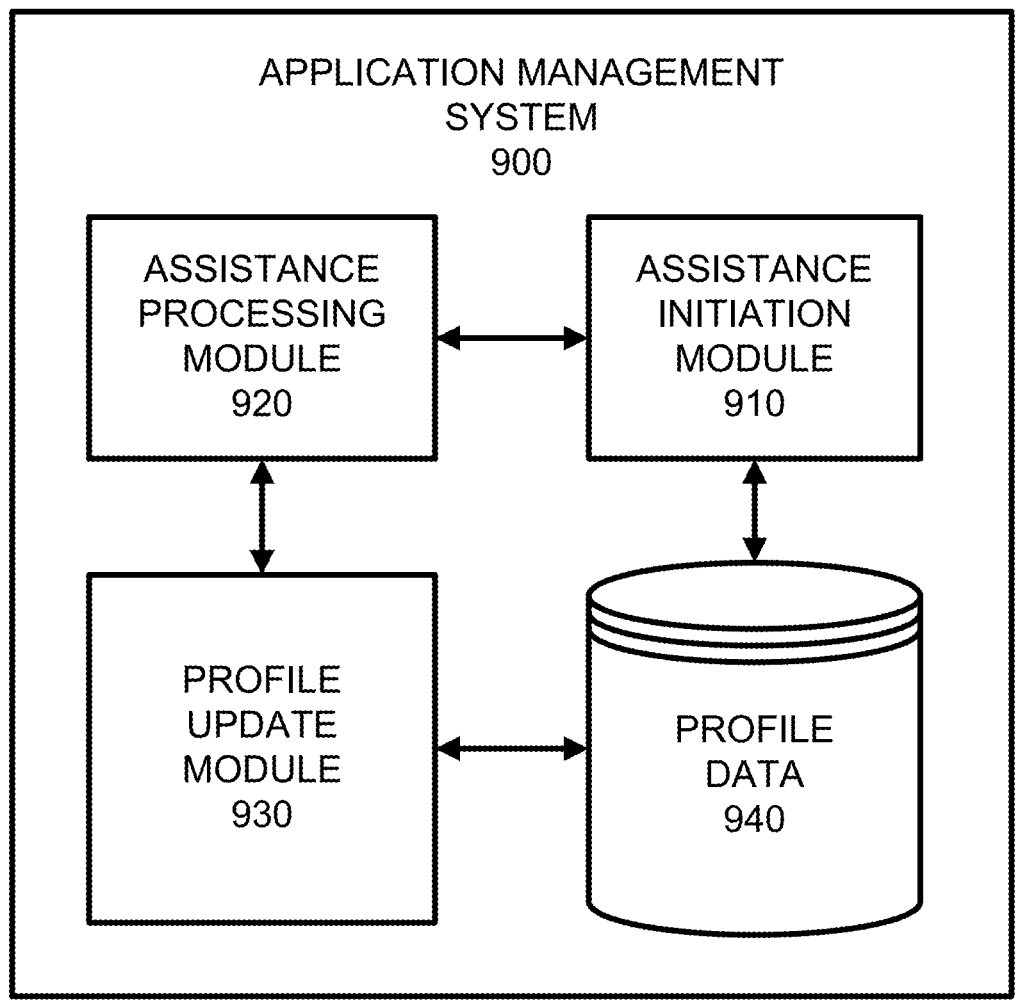
FIG. 9 illustrates an example network entity device configured to store instructions, software, and corresponding hardware for executing the same, according to example embodiments of the present application.

FIG. 9 illustrates an example network entity device configured to store instructions, software, and corresponding hardware for executing the same, according to example embodiments of the present application. Referring to FIG. 9, the system 900 may include an initiation module for assistance 910, with an assistance processing module 920 for determining the types and candidates for assistance 920 and an update module to update profile data or actions taken 930. The profile data 940 may be referenced to identify any profiles stored in the application.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 6 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving an indication from a user device;
   retrieving a user profile associated with the user device;
   comparing the user profile to one or more other user profiles associated with other user devices within a predefined distance of the user device;
   selecting a first of the other user profiles to pair with the user profile based on the comparing;
   transmitting an alert notification to a first of the other user devices associated with the first of the other user profiles;
   receiving a response indicating whether the user profile and one or more other user profiles have paired;
   receiving a failed pairing attempt notification after a predetermined amount of time after transmitting the alert notification to the first of the other user devices;
   selecting a second of the other user profiles to pair with the user profile;

initiating a timer to expire when the predetermined amount of time has lapsed;

transmitting another alert message to a second user device associated with the second of the other user profiles; and receiving a confirmation that the second user device has confirmed the alert message and the second of the other user profiles have paired with the user profile prior to the timer expiring.

2. The method of claim 1, wherein the indication from the user device is a distress notification indicating a user is in need of assistance.

3. The method of claim 1, comprising
determining a score for each of the other user profiles based on a number of parameters of each profile which match between the user profile and the other user profiles.

4. The method of claim 3, comprising
applying a plurality of different weight sizes to each of the parameters of each of the other user profiles prior to determining the score.

5. The method of claim 1, comprising
applying a largest weight to a distance parameter of the one or more user profiles that is associated with a corresponding user device having a closest proximity to the user device.

6. An apparatus comprising:
a receiver configured to receive an indication from a user device;
a processor configured to
retrieve a user profile associated with the user device;
compare the user profile to one or more other user profiles associated with other user devices within a predefined distance of the user device; and
select a first of the other user profiles to pair with the user profile based on the comparing;
a transmitter configured to transmit an alert notification to a first of the other user devices associated with the first of the other user profiles; and
a receiver configured to
receive a response indicating whether the user profile and one or more other user profiles have paired; and
receive a failed pairing attempt notification after a predetermined amount of time after the alert notification is transmitted to the first of the other user devices; and
wherein the processor is further configured to
select a second of the other user profiles to pair with the user profile; and
initiate a timer to expire when the predetermined amount of time has lapsed; and
wherein the transmitter is further configured to transmit another alert message to a second user device associated with the second of the other user profiles; and
wherein the receiver is further configured to receive a confirmation that the second user device has confirmed the alert message and the second of the other user profiles have paired with the user profile prior to the timer expiring.

7. The apparatus of claim 6, wherein the indication from the user device is a distress notification indicating a user is in need of assistance.

8. The apparatus of claim 6, wherein the processor is configured to determine a score for each of the other user profiles based on a number of parameters of each profile which match between the user profile and the other user profiles.

9. The apparatus of claim 8, wherein the processor is further configured to apply a plurality of different weight sizes to each of the parameters of each of the other user profiles prior to determining the score.

10. The apparatus of claim 6, wherein the processor is further configured to apply a largest weight to a distance parameter of the one or more user profiles that is associated with a corresponding user device having a closest proximity to the user device.

11. A non-transitory computer readable storage medium configured to store instructions that when executed cause a processor to perform:
receiving an indication from a user device;
retrieving a user profile associated with the user device;
comparing the user profile to one or more other user profiles associated with other user devices within a predefined distance of the user device;
selecting a first of the other user profiles to pair with the user profile based on the comparing;
transmitting an alert notification to a first of the other user devices associated with the first of the other user profiles;
receiving a response indicating whether the user profile and one or more other user profiles have paired;
receiving a failed pairing attempt notification after a predetermined amount of time after transmitting the alert notification to the first of the other user devices;
selecting a second of the other user profiles to pair with the user profile;
initiating a timer to expire when the predetermined amount of time has lapsed;
transmitting another alert message to a second user device associated with the second of the other user profiles; and
receiving a confirmation that the second user device has confirmed the alert message and the second of the other user profiles have paired with the user profile prior to the timer expiring.

12. The non-transitory computer readable storage medium of claim 11, wherein the indication from the user device is a distress notification indicating a user is in need of assistance.

13. The non-transitory computer readable storage medium of claim 11, wherein the processor is further configured to perform
determining a score for each of the other user profiles based on a number of parameters of each profile which match between the user profile and the other user profiles.

14. The non-transitory computer readable storage medium of claim 13, wherein the processor is further configured to perform
applying a plurality of different weight sizes to each of the parameters of each of the other user profiles prior to determining the score; and
applying a largest weight to a distance parameter of the one or more user profiles that is associated with a corresponding user device having a closest proximity to the user device.

* * * * *